3,574,550
MEANS OF IDENTIFYING CRUDE OIL AND OTHER MATERIALS

Kenneth A. Scott, Swarthmore, and Roger M. Bean, Glen Mills, Pa., assignors to Sun Oil Company, Philadelphia, Pa.
No Drawing. Filed Oct. 18, 1968, Ser. No. 768,916
Int. Cl. C10m 1/54; G01n 33/24; G21h 5/00
U.S. Cl. 23—230
4 Claims

ABSTRACT OF THE DISCLOSURE

A method of identifying petroleum compounds by adding thereto minute quantities of metallic phthalocyanines, complexes of asphaltenes and metals, or mixtures of same and determining the presence of said added components by neutron activation.

---

This invention relates to a method for identifying organic compounds, and more particularly, crude oil or other normally liquid petroleum compounds. Specifically, the invention relates to the incorporation of trace compounds into liquid petroleum compounds for subsequent use as identification means.

The object of this invention is to provide a simple method by which petroleum compounds can be labeled for subsequent identification. Although various hydrocarbons can be employed as the material to be identified, the invention finds commercial significance and is most advantageously suited for the identification of crude oils, waste products, and petroleum residues, singly or when admixed with water or other petroleum compounds. In view of the increasing concern over water pollution and the present inability to satisfactorily identify the source of polluting materials or defend against accusations of pollution, the ability to identify the source of such compounds in water is of great interest toady. The capability of distinguishing one petroleum composition from another is also of significance in view of the large volume of materials being transported by common pipeline. Detectable materials which can be employed for identification can be incorporated into crude oils or other liquids being shipped by tanker or pipeline, injected into materials being admitted into waste disposal systems, or generally incorporated into any petroleum product where subsequent identification might be desired. Thus, in the instances where pollutants are discovered in rivers or where identification of materials is required to conclude flow through a pipeline, the presence of identifiable compounds can function as the determining feature.

Heretofore, several U.S. patents have issued which are related to the subject matter of the instant invention. In particular, U.S. Patent 2,392,620 discloses the addition of 0.00000001% to about 0.001% by weight of umbelliferone or its derivatives to petroleum products which can subsequently be identified by the strongly fluorescent characteristics of the umbelliferone in an alkaline medium. Also of interest is U.S. Patent 2,325,421 which discloses the addition of carotene to mineral oil for subsequent identification by spectrophotometry and U.S. Patent 2,689,171 which discloses the addition of diazotizable primary aromatic amines to gasoline which can be subsequently extracted, diazotized, and formed into an identifiable dye.

It has now been discovered in accordance with the objects of the invention that petroleum compounds such as crude oils, asphalts, and refinery wastes can be easily identified when, either singly or in combination, metal phthalocyanines and/or complexes of asphaltenes and metals are added in minute quantities to the material to be identified. The complex of asphaltenes and metals can be prepared as described by Erdman and Harju in J. Chem. Eng. Data, vol. 8, #2, April 1963, pp. 252–258, by the reaction of acetylacetonato metallo complexes with asphaltenes. The metallic phthalocyanines can be prepared by any method well known in the art (see Phthalocyanine Compounds, Moser, F. H., and Thomas, A. L., Reinhold Publishing Corp., New York, 1963, pp. 104–142).

The phthalocyanine or complex in order to be useful for the aforesaid objects of the invention, must meet three basic criteria; that is, they must be inextricable by water from the petroleum compound, chemically stable, and easily detectable, and as such not all incorporated metals will be operable for the purpose of this invention. Those metals which are useful for the instant invention include potassium, copper, silver, zinc, beryllium, magnesium, cadmium, mercury, barium, aluminum, gallium, indium, lanthanum, neodymium, samarium, europium, gadolinium, dysprosium, holmium, erbium, thulium, ytterbium, lutecium, titanium, tin, hafnium, thorium, vanadium, antimony, chromium, molybdenum, uranium, manganese, iron, cobalt, nickel, rhodium, palladium, osmium, and platinum. The preferred metals, however, are indium, manganese, rhodium, and mercury. Additionally, the metallic compounds of vanadium, nickel, copper, iron, and zinc, although operable, are generally not employed for identifying petroleum products since they are usually present in these compounds initially.

After the metallic tracers are incorporated into the desired composition their presence can be identified by various analytical or physicochemical (e.g., X-ray spectography, neutron activation) techniques. The preferred method is that of neutron activation due to its high sensitivity to the presence of metallic compounds in minute quantities. Neutron activation is well known in the art and a disclosure of various experimental techniques is found in Guide to Activation Analysis by W. S. Lyon, D. Van Nostrand Company, Inc., Princeton, N.J. The basic principle of neutron activation is that a stable isotope, when irradiated by neutrons, undergoes a nuclear transformation to produce a radioactive nucleide. The radionucleide is characterized by radiation detection equipment, and qualitative and quantitative determination of the original sample can be deduced therefrom.

As aforesaid, due to the ease of detectability of the compounds and the sensitivity of the analytical techniques, only minute quantities of the phthalocyanines or complexes have to be incorporated in the compounds to be identified. As little as 0.000001% by weight of the identifying compound is required; however, it is preferable for adequate mixing and analytical performance that at least 0.0001% by weight be present. Although there is no definite upper limitation on the amount of compound to be added, it is generally preferable that the labeling compound be incorporated in the range of 0.0001 to 0.01% by weight.

As aforementioned, the metallic compounds can be added in combination to the material to be identified for superior results. For example, manganese and indium can be supplied in a predetermined ratio as phthalocyanine compounds to a petroleum waste stream which has been suspected of contaminating a second stream. A sample of the material when subsequently analyzed will show the presence of the metals in the predetermined ratio and hence give a positive identification of the contaminant. There are no limitations on the method of incorporating the metallic compounds in the material to be idetnified; however, to insure better mixing, it is preferable to add the tracing compound slowly in a drop-wise or continuous operation.

While the processes and modes of operation as described herein are well adapted to meet the objects of the invention, various modifications may be resorted to without departing from the scope of the invention as defined in the claims.

We claim:

1. A method of identifying a liquid petroleum composition which comprises adding to the petroleum composition at least about 0.000001% by weight of a metallic compound from the group consisting of metal phthalocyanines, complexes of asphaltenes and metals, and mixtures thereof, which compound is inextricable by water from the petroleum composition and detecting said metallic compound by neutron activation.

2. A method as described in claim 1, wherein the metal is selected from the group consisting of potassium, copper, silver, zinc, beryllium, magnesium, cadmium, mercury, barium, aluminum, gallium, indium, lanthanum, neodymium, samarium, europium, gadolinium, dysprosium, holmium, erbium, thulium, ytterbium, lutecium, titanium, tin, hafnium, thorium, vanadium, antimony, chromium, molybdenum, uranium, manganese, iron, cobalt, nickel, rhodium, palladium, osmium, and platinum.

3. A method as described in claim 2 wherein at least about 0.0001% by weight of the metallic compound is added.

4. A method for determining a source of liquid petroleum composition subject to transport which comprises adding to the petroleum composition prior to or during transport at least about 0.000001% by weight of metal phthalocyanine or a complex of asphaltene and a metal, said metal being selected from the group consisting of indium, manganese, rhodium and mercury, and identiyfing the petroluem composition at its destination by subjecting it to neutron activation to determine the presence of the added metal compound.

References Cited

UNITED STATES PATENTS

| 2,058,774 | 10/1936 | Colligan | 44—59X |
| 2,597,018 | 5/1952 | Merker et al. | 252—50X |

OTHER REFERENCES

Gibbons et al.: Chem. Abstr., 63, 16104g (1965).
Colombo, V.: Chem. Abstr., 64, 459f (1966).

MORRIS O. WOLK, Primary Examiner

R. M. REESE, Assistant Examiner

U.S. Cl. X.R.

44—59; 250—106; 252—49.7